United States Patent Office 3,397,041
Patented Aug. 13, 1968

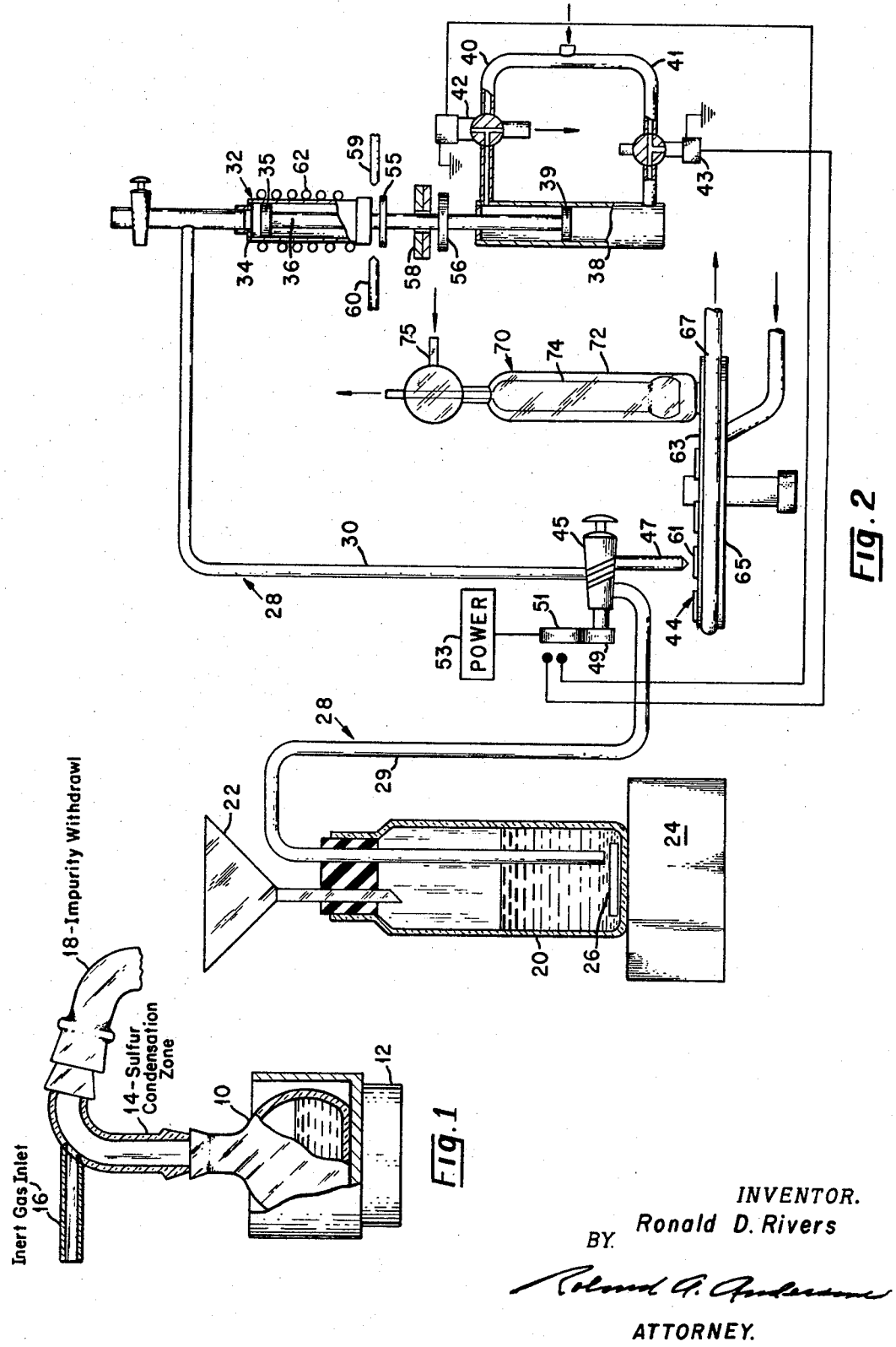

3,397,041
SULFUR PURIFICATION BY FRACTIONAL
CONDENSATION
Ronald D. Rivers, Kingston, Tenn., assignor to the United States of America as represented by the United States Atomic Energy Commission
Filed June 17, 1966, Ser. No. 559,352
6 Claims. (Cl. 23—294)

The invention described herein was made in the course of, or under, a contract with the U.S. Atomic Energy Commission. This invention relates generally to the purification of sulfur and the preparation of pellets thereof, and more particularly to a method for producing sulfur of high purity by the selective removal of organic and inorganic impurities therefrom and to apparatus for casting such purified sulfur into pellets of essentially identical size and weight.

An object of the present invention is to provide a new and improved method for providing high purity sulfur.

Another object of the present invention is to provide high purity sulfur wherein organic and inorganic residue amounting to less than about one part per million parts of sulfur remains when the sulfur is burned.

Another object of the present invention is to provide a method for effecting selective separation of organic and inorganic impurities from sulfur.

A further object of the present invention is to provide an apparatus for producing essentially identical pellets from sulfur.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description. The preferred embodiments illustrated are not intended to be exhaustive or to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

In the accompanying drawing:

FIG. 1 is a view showing, partly cut away, an assembly within which sulfur may be purified in accordance with the method of the present invention; and FIG. 2 is a somewhat schematic view showing a preferred form of apparatus for preparing essentially identical sulfur pellets in a highly repetitive manner.

Described generally, the sulfur purification method of the present invention comprises a two-part procedure which produces product sulfur with less than one part organic or inorganic impurity per million parts of sulfur. The first part of the two-part procedure comprises the decomposing and volatilizing of organics and other impurities present at and below the boiling temperature of sulfur and thereafter separating such volatilized products from the sulfur, while the second part comprises the distilling of the sulfur from the organic and inorganic residue remaining in the sulfur that are non-volatile or have volatilization temperatures higher than that of sulfur.

Described in greater detail and with reference to FIG. 1 wherein there is shown an arrangement suitable for practicing the sulfur purification method of the present invention, impure sulfur, i.e., sulfur containing a sufficient quantity of impurities as to render it unsuitable for its intended use, is admitted to an open-topped containment flask or vessel 10 and heated to its boiling temperature (444.6° C. at sea level) by a suitable heating mechanism, e.g., a conventional heating mantle 12. This boiling of the sulfur effects decomposition and volatilization of essentially all organics and other impurities present at and below the boiling temperature of sulfur and produces a vapor composed of sulfur and such volatilized impurities. Normally, there are no organic or inorganic impurities in sulfur that have the same volatilizing temperature as that of sulfur. Also, a quantity of magnesium oxide is preferably introduced into the vessel 10 along with the sulfur for greatly enhancing the decomposition of the organics in the sulfur. A quantity of magnesium oxide found to provide satisfactory results is about one weight percent of the sulfur charge. The vapor stream rising from the boiling sulfur passes through the top of the vessel 10 and into an elbow-shaped conduit 14 which is coupled to the vessel 10 and provided with a gas inlet line 16 in registry with the interior of the conduit 14 at the portion thereof defining the elbow. Line 16 provides a means for introducing a purge gas, preferably nitrogen or another suitable inert gas into the conduit 14 for removing the volatilized decomposition products from the vapor stream after the sulfur condenses and returns to the vessel. In other words, as the vapor stream flows upwardly into the conduit 14 it cools to a temperature lower than the boiling point of sulfur to cause the sulfur to condense out of the vapor stream and return to the vessel while the more readily volatile impurities or decomposition products, i.e., the vapor stream constituents that volatilize at a temperature lower than the boiling point of sulfur, continue to rise in the conduit 14 to a location where they are intercepted by a stream of purge gas entering the conduit 14 from line 16 and thereafter swept from the conduit. The line 16 is preferably disposed generally perpendicular to the portion of the conduit 14 coupled to the vessel 10 for providing a flow path for the purge gas that is substantially perpendicular to the flow path of the rising vapors for assuring that the contact of purge gas with the vapors is achieved in close proximity to the inlet for the gas line. Thus, with the rising sulfur-containing vapor stream cooling to a temperature sufficient to condense out the sulfur at a location in the conduit 14 just below the coupling with the gas inlet line 16 only the decomposition products remaining in a vapor state are contacted by the stream of purge gas. The location in the conduit 14 at which the condensation of the sulfur is completed may be controlled by appropriately varying the amount of heat supplied to the sulfur charge within the vessel 10.

The impurities or condensation products entrained by the purge gas may be driven from the conduit 14 through conduit 18 into a suitable receptacle (not shown) or disposed of in any other suitable manner. It may be desirable to provide the portion of the conduit 14 remote to the vessel 10 and beyond the elbow with a slight downward inclination to assure that impurities which condense after being contacted by the purge gas do not return to the vessel. Also, the flow of purge gas should be sufficient to prevent air from reaching the boiling sulfur since an explosive condition may result.

In order to remove essentially all the impurities present in the sulfur below the boiling point of sulfur, a continuous refluxing action of the sulfur-containing vapor stream is maintained by continuously boiling the sulfur for a desired time period. In this way it is assured that essentially all such impurities are volatilized and subjected to the purging gas stream. In a typical operation the organics in three kilograms of sulfur that are volatile below the boiling point of sulfur can be reduced to less than one part per million parts of sulfur in about four hours' boiling time.

After completing the removal of the decomposition products by the above boiling procedure the sulfur may be removed from the residue remaining in the vessel by distilling the sulfur therefrom. To accomplish this distillation of the sulfur, the gas flow into purge line 16 and the heating of the sulfur charge in vessel 10 are terminated and a suitable receptacle (not shown) is coupled to the open end of conduit 14 or conduit 18. The vessel 10 and its contents may then be heated to and maintained at the boiling temperature of the sulfur to produce a vapor stream consisting of essentially pure sulfur which flows from the vessel 10 into the sulfur containment receptacle. This distillation procedure removes the sulfur from solid organics, magnesium oxide, and any other organic or inorganic impurities which are non-volatile at the boiling temperature of sulfur.

To assure that sulfur rising in conduit 14 does not condense out and return to the vessel 10 prior to reaching the containment vessel or at least to a location in the conduit 14 beyond the elbow, a greater quantity of heat may be added to the sulfur charge in the vessel 10 by the heating mantle 12 than used during the abovedescribed boiling procedure. However, care should be exercised to assure that the vessel contents are not heated to a temperature above about 445° C., since this may effect volatilization of some impuries along with the sulfur. Another practice for inhibiting undesirable volatilization of impurities or sulfur condensation in the conduit 14 may be to replace the conduit 14 with a conduit having a configuration similar thereto but capable of providing a shorter spacing between the vessel 10 and the elbow. In either of the above procedures care should be exercised to assure that the interior of the conduit is free of contaminants that may be picked up by the sulfur vapors. Also, like with the above-described boiling procedure, air should not be allowed to come in contact with the boiling sulfur, thus requiring that the nitrogen purge gas through line 16 be used during the distillation or that the coupling between the conduits 14 or 18 and the sulfur containment receptacle form a substantially air-tight seal. When using a tightly sealed distillation system, a suitable pressure responsive valve is preferably used in the conduits 14 or 18 or in the sulfur receiving receptacle for venting excess pressure from the system without admitting air.

In a typical sulfur purification operation a three-kilogram charge of impure sulfur including one weight percent magnesium oxide is placed in the vessel 10 and heated to a temperature sufficient to effect boiling of the sulfur and the volatilization of organics which are volatile at or below the boiling point of sulfur. This boiling continues for about four hours to reduce the content of such organics in the sulfur to less than one part per million. During this boiling period about 250 cubic centimeters of nitrogen per minute are introduced into the conduit 14 through line 16 to sweep the volatilized decomposition products from the conduit. After completing the boiling operation the sulfur is preferably cooled to about 130° C. to about 140° C. before exposing the sulfur to air. Then the conduit 14 may be replaced with another conduit of similar construction and a sulfur receiving receptacle (not shown) attached thereto. The heating mechanism 12 may then be activated to again heat the sulfur to its boiling point to produce vapors thereof which rise from the boiling sulfur and pass through the conduit, while undergoing condensation, and discharge into the receptacle.

Normally, a three-kilogram charge of impure sulfur yields approximately two and one-half kilograms of product sulfur in about eight hours which includes about four hours' boiling time for removing the impurities volatile at and below the boiling temperature of sulfur and in about four hours' distillation time for removing the sulfur from the residue in the vessel 12. This product sulfur contains less than one part of organic or inorganic impurities per million parts pure sulfur with, perhaps, the exception of some absorbed gases and/or water which are not detrimental for most uses of high purity sulfur, e.g., neutron dosimeter applications. If desired, the absorbed gases, such as, for example, hydrogen sulfide, that are highly soluble in sulfur may be removed by using a longer boiling period during the first part of the two-part sulfur purification procedure. Also, the water in the sulfur, which apparently is absorbed after the sulfur cools due to an inadequately sealed receptacle, may be eliminated by maintaining the sulfur at a temperature above the boiling point of water or by assuring that the receptacle is tightly sealed.

After the high purity sulfur is produced by practicing the abovedescribed purification method and analyzed for determining its purity, it may be cast into disc-shaped pellets for subsequent use. In FIG. 2 there is shown a system for fabricating pellets of sulfur with the pellets exhibiting essentially similar dimensions and very minute deviations in weight. Generally, this system is a highly precise semi-automatic system which is capable of withdrawing a preselected quantity of liquid sulfur from a reservoir, delivering the withdrawn sulfur to a cooled mold to form a cast pellet, and thereafter melting the upper or exposed surface of the pellet to provide a smooth surface on the pellet.

As shown, the pellet fabricating system comprises a covered reservoir 20 to which sulfur is admitted through a normally covered funnel 22 and maintained at a selected temperature above the melting point of sulfur (113° C.) by a suitable heating device 24. The liquefied sulfur in the reservoir 20 is preferably continuously stirred by a suitable mechanism, such as, for example, a magnetic mixer which may be incorporated in the heating device 24 and include a magnetic mixing bar 26 disposed in the reservoir. A sulfur withdrawal conduit 28 consisting of conduit segments 29 and 30 connects the lower portion of the reservoir interior with the inlet to a syringe 32 which is used to withdraw precise amounts of the sulfur from the reservoir 20 and dispense it into suitable pellet forming molds.

The syringe 32 may be of any suitable conventional construction which may include an elongated cylinder 34 with a reciprocable plunger or piston 35 disposed therein and operatable by an externally applied force through a piston rod 36. For example, in the system of the present invention the externally applied force for reciprocating the piston is shown comprising a double-acting air cylinder 38 having a reciprocable piston 39 disposed therein and forming part of or attached to the rod 36 for the syringe 32. Air inlet and exhaust lines 40 and 41 are coupled to the cylinder 38 adjacent opposite ends thereof and to suitable supply of compressed air (not shown). Three-way solenoid valves 42 and 43 disposed in air lines 40 and 41, respectively, are utilized to control the flow of air to and from the cylinder 38 to provide movement of the piston 39 and operation of the syringe 32. The valves 42 and 43 are, in turn, controlled by an electrical circuit in a manner to be described below.

In order to fill the syringe 32 with liquid sulfur from the reservoir 20 and to fill the pellet forming molds 44, with sulfur from the syringe 32, a three-way stop cock 45 is coupled to conduit 28 intermediate segments 29 and 30 thereof. Another conduit or sulfur dispensing tip 47 extends from the stop cock 45 to a location above the molds 44 for facilitating the filling of the latter. When it is desired to fill the syringe 32 with a desired amount of sulfur the stop cock 45 is rotated to place the reservoir 20 in registry with the syringe 32 through conduit segments 29 and 30 while disconnecting the sulfur dispensing tip 47 from the syringe 32. The solenoid valves 42 and 43 are respectively energized and de-energized, preferably simultaneously with the rotation of the stop cock 45, to place the air supply in registry with the upper end of the cylinder while connecting the lower end of the cylinder to atmosphere for effecting downward movement of the piston 35 to draw sulfur from the reservoir 20 through conduit 28 into the syringe 32.

The solenoid valves 42 and 43 may be actuated in the desired manner simultaneously with the rotation of the stop cock 45 by providing the latter with a cam 49 which, in turn, operates a suitable switch 51 for coupling or decoupling the valves 42 and 43 from a suitable power supply as generally indicated at 53.

The quantity of sulfur drawn into and discharged from the syringe 32 may be controlled by securing stops 55 and 56 to the piston rod 36 on opposite sides of a relatively stationary structure 58. These stops are preferably selectively movable along the piston rod 36 or provided with suitable shims so as to provide a mechanism for varying the quantity of sulfur drawn into or discharged from the syringe. Also, it may be desirable to flow a stream of heated air over the piston rod 36 through lines 59 and 60 to assure that sulfur which may coat the piston rod does not solidify thereon during the discharge stroke of the syringe since such a solid sulfur coating may be deleterious to the operation of the syringe. A suitable electric heating element 62 may be disposed about the syringe 32 to maintain the sulfur in a liquid state.

With the syringe 32 filled with a desired quantity of sulfur, the stop cock 45 is again rotated so as to place the dispensing tip 47 in registry with the syringe 32 through the conduit segment 30 while simultaneously disconnecting the reservoir from the syringe and reversing the position of the solenoid valves 42 and 43 through actuation of switch 51 so that the sulfur is forced from the syringe into one of the molds 44. As pointed out above, the quantity of sulfur discharged from the syringe is controlled by the position of stop 56, thus assuring that each mold 44 is filled with a preselected quantity of sulfur.

The molds 44 into which the sulfur is discharged may comprise a plurality of glass rings 61 positioned for successive registry with the dispensing tip 47 on a turntable or rotatable disc 63 coated with or formed of polytetrafluoroethylene or another suitable "non-sticking" material. The disc 63 is preferably rotated in such a manner as to place an empty ring 61 beneath the dispensing tip 47 during the interval when the syringe filling is being accomplished. This selective rotation may be achieved by a suitable stepping motor (not shown) powered by the power supply 53 and controlled by the cam operated switch 51.

In order to rapidly cool the liquid sulfur after it is dispensed into one of molds 44 the disc may be positioned in close proximity to a cooled stationary disc 65. The cooling of this disc 65 may be achieved by disposing a length of tubing 67 in the configuration of a coil or any other suitable configuration adjacent to the disc 65 and passing liquid nitrogen vapor or other coolant therethrough.

When the liquid sulfur is cast into pellets and is in the process of solidifying, recrystallization and meniscus effects take place and thereby cause a considerable number of voids and a saw-toothed design to appear in the upper surface of the pellet. To provide these pellets with a smooth and uniform upper surface a heating device may be employed to melt the upper surface of the pellets while the pellets are still in the molds 44. This heating device, as generally shown at 70, is preferably positioned above and in close proximity to the molds 44 at a location circumferentially spaced from the dispensing tip 47 to assure that solidification of the sulfur is complete before the cast pellet reaches the heating device. A satisfactory surface melter or heating device 70 may comprise a pair of coaxially disposed tubes 72 and 74 with the outer tube 72 having a gas inlet 75 at the upper end thereof and an opening at the lower end thereof for placing the upper surface of the pellet in registry with the interior of the tube 72. The exhaust or inner tube 74 discharges at the upper end thereof and has a lower end thereof terminating in a location above the lower end of tube 72 that is enlarged to provide an annular restricted orifice between the tubes for accelerating the downwardly flowing incoming gas to enhance the pellet-surface-smoothing operation. The gas used to melt the surface of the sulfur pellets may be helium or any other suitable inert gas that is heated in any desired manner. Also, it may be preferable to provide the gas inlet 75 with a suitable valve (not shown) that may be interlocked to the rotatable disc so as to stop the gas flow during rotation of the table.

During a typical sulfur pellet casting operation while using the above-described system twenty sulfur pellets were prepared with the pellets having an average diameter of 1.5 inches and an average thickness of 0.43 of an inch. The desired or preselected weight for each of these pellets was to be 22 grams and subsequent measurements established that the average weight of the pellets was 22.0853 grams with a standard deviation of ±0.0088 of a gram per pellet.

It has been found to be preferable to conduct the pellet casting operation in a timed cycle to minimize or prevent erratic variations in pellet weight due to temperature or pressure variations. For example, a one-pellet-per-minute cycle was used to prepare the twenty pellets mentioned above with one-half of a minute being allotted for filling the syringe 32 and establishing equilibrium in the system and the other half minute being allotted for discharging the sulfur from the syringe 32 into a mold 44 and draining the dispensing tip 47.

While the casting system described above is a semi-automatic system due to the manual manipulation of the stop cock 45, it will appear clear that a fully automatic system may be provided by using a timed stepping motor or the like for actuating the stop cock 45 and interconnecting the various valves, the turntable, and the surface melter 70 to the stepping motor or switch 51 for activation thereby.

It will be seen that the present invention sets forth a unique method for producing highly purified sulfur in a manner exhibiting substantial monetary savings and greater purification over previously employed sulfur purification techniques. Also, the pellet casting system of this invention provides a mechanism by which essentially identical sulfur pellets may be readily fabricated in a highly precise and repetitive manner. Furthermore, the use of this pellet casting system obviates the handling of purified sulfur such as by grinding, weighing, etc., so as to prevent the introduction of further impurities into the sulfur.

As various changes may be made in the form, construction, and arrangement of the parts herein without departing from the spirit and scope of the invention and without sacrificing any of its advantages, it is to be understood that all matter herein is to be interpreted as illustrative and not in a limiting sense.

I claim:
1. A method of removing organic and inorganic impurities from sulfur to provide product sulfur having less than about one part of said impurities per million parts of sulfur, comprising the steps of confining a sulfur charge containing organic and inorganic impurities, heating the sulfur charge to a temperature sufficient to effect boiling thereof for providing vapors consisting of sulfur and impurities volatile at and below the boiling temperature of sulfur, cooling the vapors to a temperature sufficient to effect condensation of the sulfur from the vapors, introducing a stream of inert gas into the confinement above the sulfur charge at a location in which the temperature of at least a portion of the vapors is less than the condensing temperature of the sulfur and greater than the condensing temperature of essentially all the volatilized impurities to contact and entrain the latter, exhausting the impurity-laden stream of inert gas from the confinement, thereafter discharging vapors consisting essentially of sulfur from the confinement to separate the sulfur from non-volatile impurities and volatile impurities in the sulfur charge having a higher volatility temperature than that of sulfur, and distilling and collecting the discharged sulfur vapors.

2. The method of removing organic and inorganic impurities from sulfur as claimed in claim 1, including the additional step of adding magnesium oxide to the sulfur charge prior to the heating thereof with said magnesium oxide being of a quantity sufficient to enhance decomposition of organic impurities.

3. The method of removing organic and inorganic impurities from sulfur as claimed in claim 1, including the additional step prior to discharging the sulfur vapors from the confinement of continuously refluxing the vapors by maintaining the sulfur charge at the sulfur boiling temperature for a sufficient time to effect the volatilization of essentially all impurities volatile at and below the boiling temperature of sulfur and the exposure of the volatilized impurities to the stream of inert gas for entrainment thereby.

4. The method of removing organic and inorganic impurities from sulfur as claimed in claim 1, including the additional steps of flowing the stream of inert gas into the confinement at a velocity sufficient to sweep the volatilized impurities from the confinement and along a plane overlying and generally parallel to the surface of the boiling sulfur, and at least initially flowing the impurity-laden exhaust stream of inert gas from the confinement along a flow path generally parallel to said plane for inhibiting the return of the volatilized impurities upon condensation thereof.

5. The method of removing organic and inorganic impurities from sulfur as claimed in claim 1, wherein the vapor cooling step for condensing the sulfur from the vapors is provided by a cooling zone intermediate the boiling sulfur and said location, and wherein the effective length of said cooling zone is selectively varied by changing the quantity of heat input into the sulfur charge.

6. The method of removing organic and inorganic impurities from sulfur as claimed in claim 1, including the additional steps of terminating the input of heat into the sulfur charge for cooling the sulfur charge subsequent to the removal of volatilized impurities from the confinement, and thereafter adding a greater amount of heat to the sulfur charge than added prior to the interruption of the stream of inert gas for increasing the temperature of the sulfur vapors in said location for facilitating the discharge of sulfur vapors from the confinement.

References Cited
UNITED STATES PATENTS

| | | | |
|---|---|---|---|
| 873,812 | 12/1907 | Walter | 23—227 |
| 1,518,126 | 12/1924 | Reed | 23—294 |
| 2,169,261 | 8/1939 | Lee | 23—224 |
| 3,362,796 | 1/1968 | Jefferies | 23—294 |

NORMAN YUDKOFF, *Primary Examiner.*

G. P. HINES, *Assistant Examiner.*